Patented Feb. 7, 1939

2,146,406

UNITED STATES PATENT OFFICE

2,146,406

MANUFACTURE OF NEW QUATERNARY AMMONIUM SALTS

Henry Alfred Piggott, Blackley, Manchester, England, assignor to Imperial Chemical Industries Limited, a corporation of Great Britain No Drawing. Application January 7, 1938, Serial No. 183,877. In Great Britain January 14, 1937

5 Claims. (Cl. 260—289)

This invention relates to the manufacture of new quaternary ammonium oxalates.

Some water-soluble quaternary ammonium salts corresponding to the formula

R—O—CH$_2$—N(tert)—X where R stands for an aliphatic hydrocarbon radical, N(tert) stands for the molecule of a tertiary organic amine and X stands for halogen, are known compounds, for example, cetyloxymethylpyridinium chloride. Other related water-soluble salts which may be similarly prepared are, for example, butyloxymethylpyridinium chloride, octadecyloxymethylpyridinium chloride and dodecyloxylmethylpyridinium chloride. Also, corresponding water-soluble quaternary ammonium sulphites or pyrosulphites, i. e. where X in the above formula stands for the sulphite or pyrosulphite radicle, may be made by reacting in presence of a tertiary amine, an aliphatic alcohol, for example, cetyl alcohol, with sulphur dioxide and formaldehyde (see U. S. application Serial No. 140,983). Many of the above mentioned salts, although soluble in water, are difficult to purify and to obtain in a crystalline condition.

This invention has as an object to devise a process for the manufacture of new quaternary ammonium oxalates. A further object is to devise a process for the manufacture of quaternary ammonium salts which will be easy to crystallize and purify. Further objects will appear hereinafter.

These objects are accomplished by the following invention. I have now found that salts of the kind referred to may readily be converted into water-soluble, crystalline acid oxalates which are particularly advantageous for use in some textile treatment processes.

According to the present invention I manufacture new quaternary ammonium acid oxalates by interacting a quaternary ammonium salt of the general formula R—O—CH$_2$—N(tert)—X where R stands for an aliphatic hydrocarbon radicle of at least sixteen carbon atoms, N(tert) stands for the molecule of pyridine, a C-alkyl-pyridine or quinoline and X stands for the radicle of an acid other than oxalic acid, with oxalic acid or a salt thereof in the presence of a liquid organic diluent.

The new quaternary salts may thus be considered as being derivatives of aliphatic alcohols on the one hand and tertiary amines on the other.

As alcohols suitable to be used in their manufacture there may be mentioned cetyl alcohol, octadecyl alcohol, eikosyl alcohol, ceryl alcohol, melissyl alcohol, while as suitable tertiary amines there may be mentioned pyridine, the picolines, the lutidines and quinoline.

The liquid organic diluent mentioned above may conveniently be provided by using in the synthesis of the initial material a quantity of tertiary amine in excess of the stoichiometric proportion, and then using the reaction mass directly for conversion into the oxalate. Alternatively, other inert organic diluents such as methanol, ethanol, or ethyl acetate, or mixtures of organic liquids such as mixtures of ethanol and acetone may be used.

The invention is illustrated but not limited by the following examples in which the parts are by weight.

Example 1

A pyridine solution of cetyloxymethylpyridinium sulphite is prepared as follows:

25 parts of cetyl alcohol, 8 parts of paraformaldehyde and 64 parts of pyridine are mixed together and heated to 80° C. Sulphur dioxide is passed into the mixture, the temperature being maintained at 80–90° C. The passing in of sulphur dioxide is continued until a sample of the reaction mixture is completely soluble in cold water.

To the hot pyridine solution of cetyloxymethylpyridinium sulphite obtained as described above there are added 9.3 parts of anhydrous oxalic acid and the mixture is stirred at 85–90° C. until the oxalic acid has dissolved. The solution is allowed to stand and cool until the separation of crystals is complete. The crystalline material is filtered off, washed with pyridine and dried. The cetyloxymethylpyridinium acid oxalate thus obtained is colourless, crystalline and readily soluble in water.

Example 2

4 parts of mixed cetyloxy- and octadecyloxymethylpyridinium chlorides prepared from a technical stearyl alcohol (which is obtained by reducing technical stearic acid) are dissolved by gentle warming in 15 parts of methanol. To this solution there are added 1.1 parts of anhydrous oxalic acid dissolved in 6 parts of warm pyridine bases. The mixture is thoroughly stirred and allowed to cool. The white crystalline substance that separates is filtered off, washed with methyl alcohol, then with boiling acetone and dried.

2          2,146,406

There are thus obtained 3.2 parts of a mixture of cetyloxy- and octadecyloxy-methylpyridinium hydrogen oxalates, M. P. 116–118° C. The white crystalline product dissolves in warm water to a colourless foaming solution which reacts acid towards Congo red and slowly becomes turbid and decomposes on boiling.

*Example 3*

27 parts of octadecyl alcohol, 64 parts of pyridine and 8 parts of paraformaldehyde are stirred together at 80° C. and sulphur dioxide is passed into the mixture, at such a rate that the temperature remains at 84–88° C., until a sample of the reaction mixture is completely soluble in cold water.

To the hot pyridine solution of octadecyloxy-methylpyridinium sulphite thus obtained there are added 10 parts of anhydrous oxalic acid and the mixture is stirred at 85–90° C. until it forms a clear homogeneous liquid. On cooling slowly to 20° C. during several hours a white crystalline solid separates. This is filtered off and recrystallized from methyl alcohol. Octadecyloxy-methylpyridinium acid oxalate is thus obtained in the form of silvery plates of M. P. 117–118° C. which dissolve in warm water to give a clear foaming solution which reacts strongly acid to Congo red paper. If this solution is boiled, a precipitate is slowly formed.

The oxalate formed in Example 1 has the probable formula

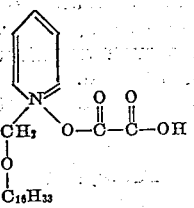

The oxalate formed in Example 2 will be a mixture of the oxalate formed in Example 1 and an oxalate with the probable formula

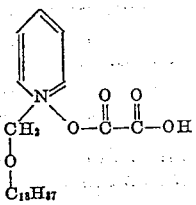

As many apparently widely different embodiments of this invention may be made without departing from the spirit and scope thereof, it is to be understood that I do not limit myself to the specific embodiments thereof, except as defined in the appended claims.

I claim:

1. Process for the manufacture of new quaternary ammonium acid oxalates which comprises causing oxalic acid or a salt thereof to react, in the presence of an inert liquid organic diluent, with a quaternary ammonium salt of the general formula

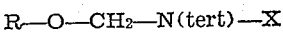

where R stands for an aliphatic hydrocarbon radicle of at least sixteen carbon atoms, "N(tert)" stands for a molecule of the class consisting of pyridine, the C-alkylpyridines and quinoline, and X stands for the radicle of an inorganic acid.

2. A compound of the general formula

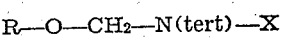

wherein R stands for an aliphatic hydrocarbon radical of at least 16 carbon atoms, "N(tert)" stands for a molecule of the class consisting of pyridine, the C-alkyl-pyridines and quinoline, and X stands for the acid-oxalate radical, said compound being soluble in warm water to give a foaming solution, and being further characterized by its ability to precipitate in crystalline form from organic solvents.

3. A compound of the general formula

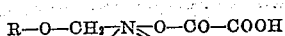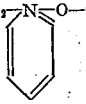

wherein R stands for an aliphatic hydrocarbon radical of at least 16 carbon atoms, said compound being soluble in warm water to give a foaming solution, and being characterized by its ability to precipitate in crystalline form from organic solvents.

4. The compound cetyl-oxy-methyl-pyridinium acid-oxalate, being a crystalline solid, soluble in warm water with an acid reaction to Congo.

5. The compound octadecyloxy-methyl-pyridinium acid-oxalate, being a crystalline solid, soluble in warm water with an acid reaction to Congo.

HENRY ALFRED PIGGOTT.